United States Patent [19]

Jäckle

[11] Patent Number: 4,684,260

[45] Date of Patent: Aug. 4, 1987

[54] ASTRONOMICAL CLOCK

[75] Inventor: Horst Jäckle, Kappel, Fed. Rep. of Germany

[73] Assignee: Johann Jackle Metallwarenfabrik, GmbH & Co., Schwenningen, Fed. Rep. of Germany

[21] Appl. No.: 828,873

[22] Filed: Feb. 12, 1986

[30] Foreign Application Priority Data

Feb. 15, 1985 [DE] Fed. Rep. of Germany ....... 3505222

[51] Int. Cl.[4] .......................................... H04B 19/26

[52] U.S. Cl. ...................................... 368/16; 368/18

[58] Field of Search .................................. 368/15-19

[56] References Cited

U.S. PATENT DOCUMENTS 1,126,214 1/1915 Herschede ........................ 368/18

3,721,083 3/1973 Jauch ................................ 368/18

4,548,512 10/1985 Erard ................................ 368/18

FOREIGN PATENT DOCUMENTS 2944747 5/1981 Fed. Rep. of Germany ........ 368/19

2303321 1/1976 France ................................ 368/15

*Primary Examiner*—Bernard Roskoski

*Attorney, Agent, or Firm*—Leonard Bloom

[57] ABSTRACT

An astronomical clock shows on a moon disc diametrically opposed images of the sun and the moon or, respectively, two moons which during twenty four hours appear alternately in a semicircular opening and travel through it. Approximate images of the moon phases are rendered with daily advanced moon phase discs which are attached off-center in a rotating fashion on the moon disc.

13 Claims, 12 Drawing Figures

FIG. 4
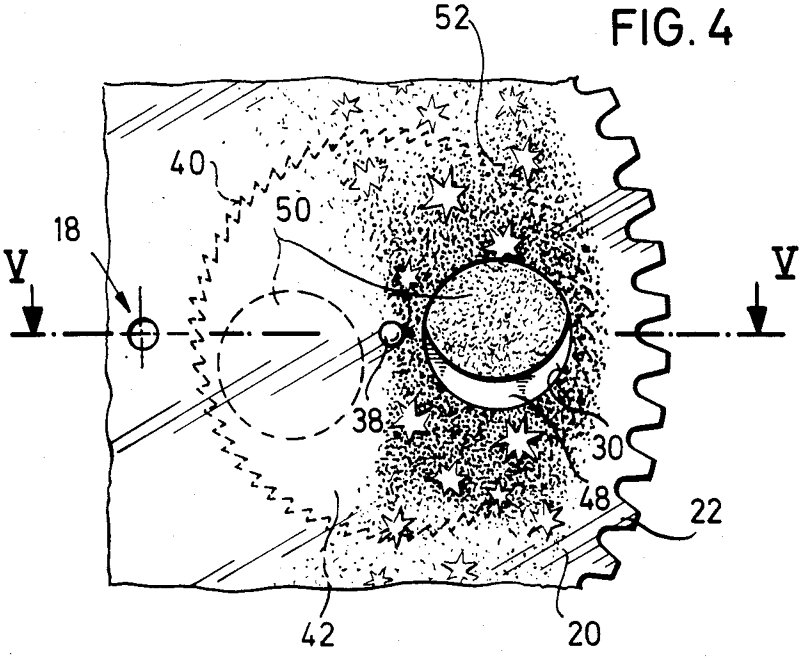
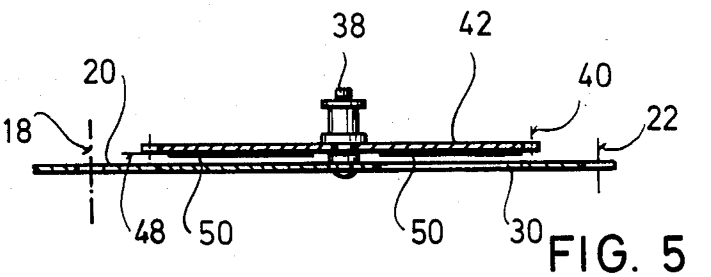
FIG. 5

ASTRONOMICAL CLOCK

BACKGROUND

An astronomical clock is known from EP-Patent application No. 107 177. A rather complicated and approximate drive for the moon's image is provided with this known clock, whereby the clock movement drives the moon's image through a geartrain so that it makes one daily revolution, continuously changing the moon's phase. The rising and setting of the moon are indicated through markings for the horizon. A presentation of the course of the sun or a differentiation of the moon by day or night is not provided for in this known clock.

SUMMARY OF THE INVENTION

The invention strives, on the one hand, for a significant simplication of the drive mechanism and, on the other hand, for an extension through the presentation of the sun's and moon's paths during the day in addition to the moon's path by night.

The invention foregoes knowingly the continuous change of the moon phase, and the variable dependencies of the sun and moon pictures upon the indicated clock time. The sun and moon pictures show alternately, in a much more extensively diagrammatic and decorative manner, a 12 hour daylight arc for the sun and a 12 hour night arc for the moon, which of course is presented with the correct mean phase of the moon appropriate for the current night.

The invented clock is of unusually simple construction since, in addition to a conventional 12-hour clock mechanism with corresponding dial, there is required only a moon disc with the corresponding picture of the sun and/or moon, a corresponding opening in the clock's face, preferably outside the dial, and an arrangement for the once-daily changing of the indicated moon phase. Although the clock does not make any claim to reproduce the accurate astronomical positions of the moon and sun, it does nevertheless give the user in decorative fashion the difference between the day and night arc of the sun and/or of the moon as well as the approximate phase of the moon, which for many purposes is sufficient, and which is particularly useful as a partly decorative and partly informative element for a free standing- or a wall clock.

The moon phase discs are advanced in a very simple manner only once by a full revolution of the moon disc, so that in the next night the night's corresponding mean moon phase appears in the cut-out.

The daily advance of the moon phase discs results preferably during the day, through a control wheel residing on the moon disc, which works together with a straight geared bridge fixed to the clock movement, and which enables the advance by passage through this gear bridge. A full revolution of the control gear can take place as necessary, therefore, whereby a cam connected to the control gear enables the advance of the moon phase disc with respect to the the moon disc.

With the help of the figures, a practical example of the invention will be further explained.

BRIEF DESCRIPTION OF THE DRAWINGS

FIG. 4 an enlarged part-view of the moon disc with its attached moon phase disc as in FIG. 1

FIG. 5 a cross-section along Line V—V in FIG. 4

DESCRIPTION OF PREFERED EMBODIEMENTS

Figure 1:
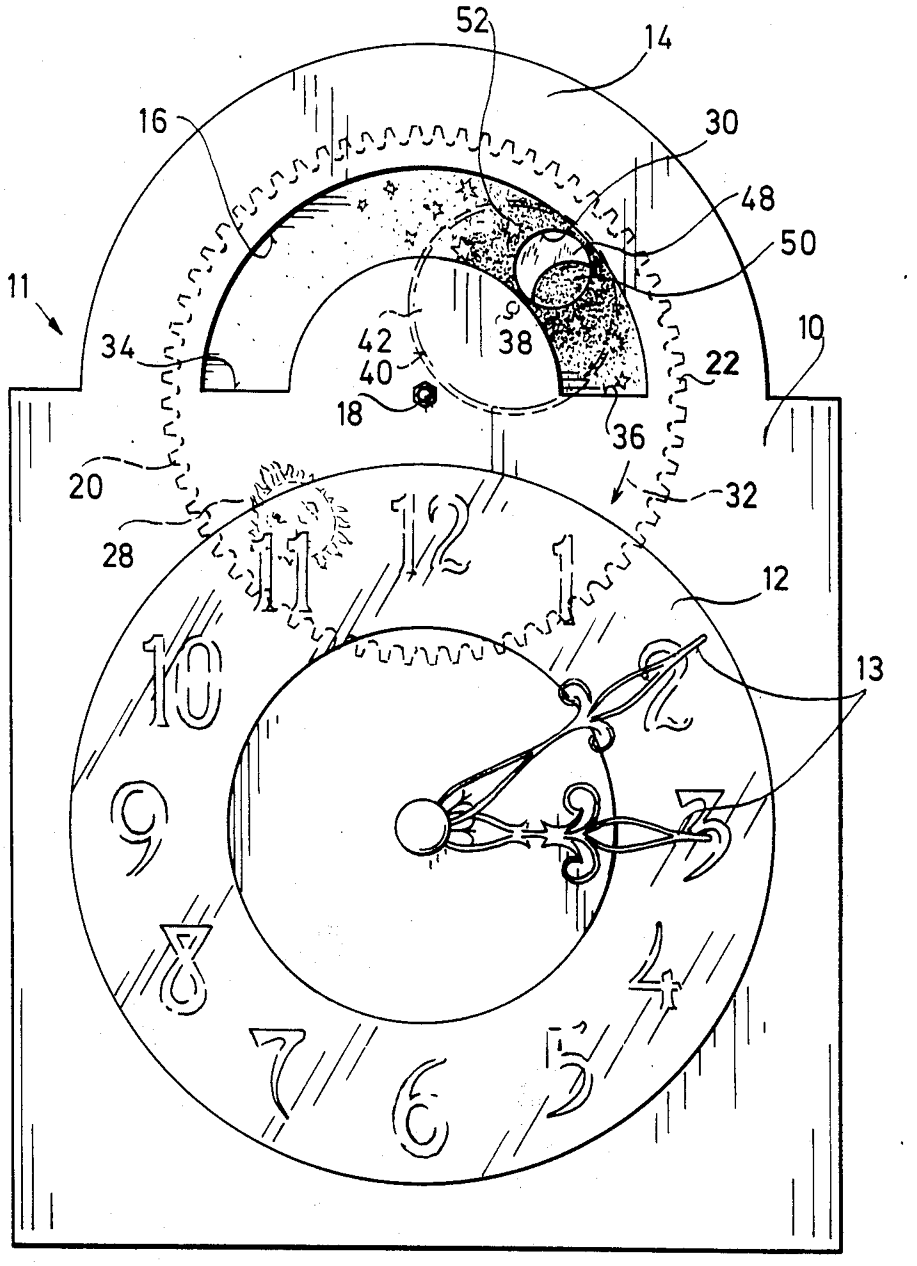
FIG. 1 a front view of the first prototype of the clock without weights
Figure 1A:
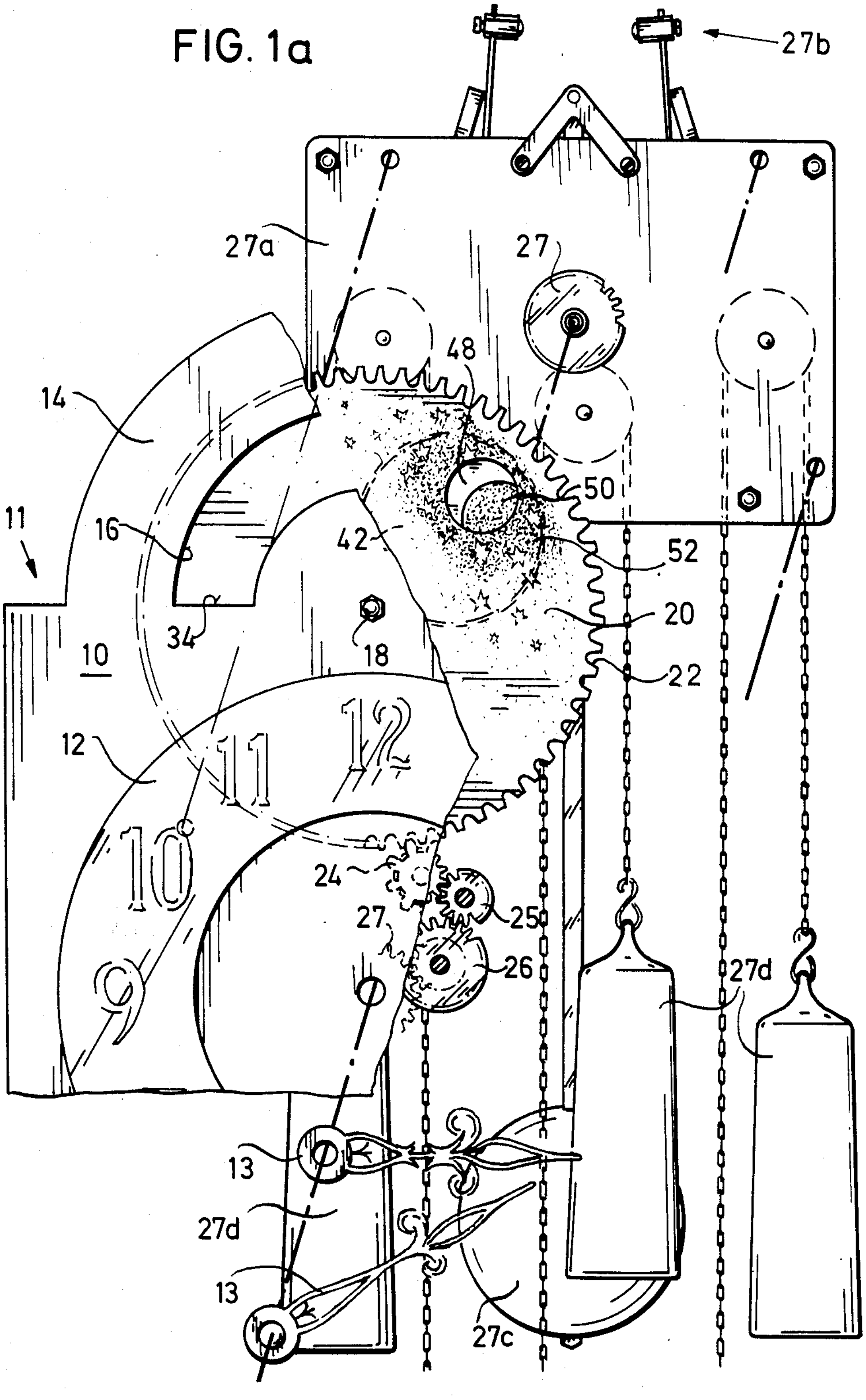
FIG. 1*a* an exploded view of the clock as shown in FIG. 1
Figure 2:
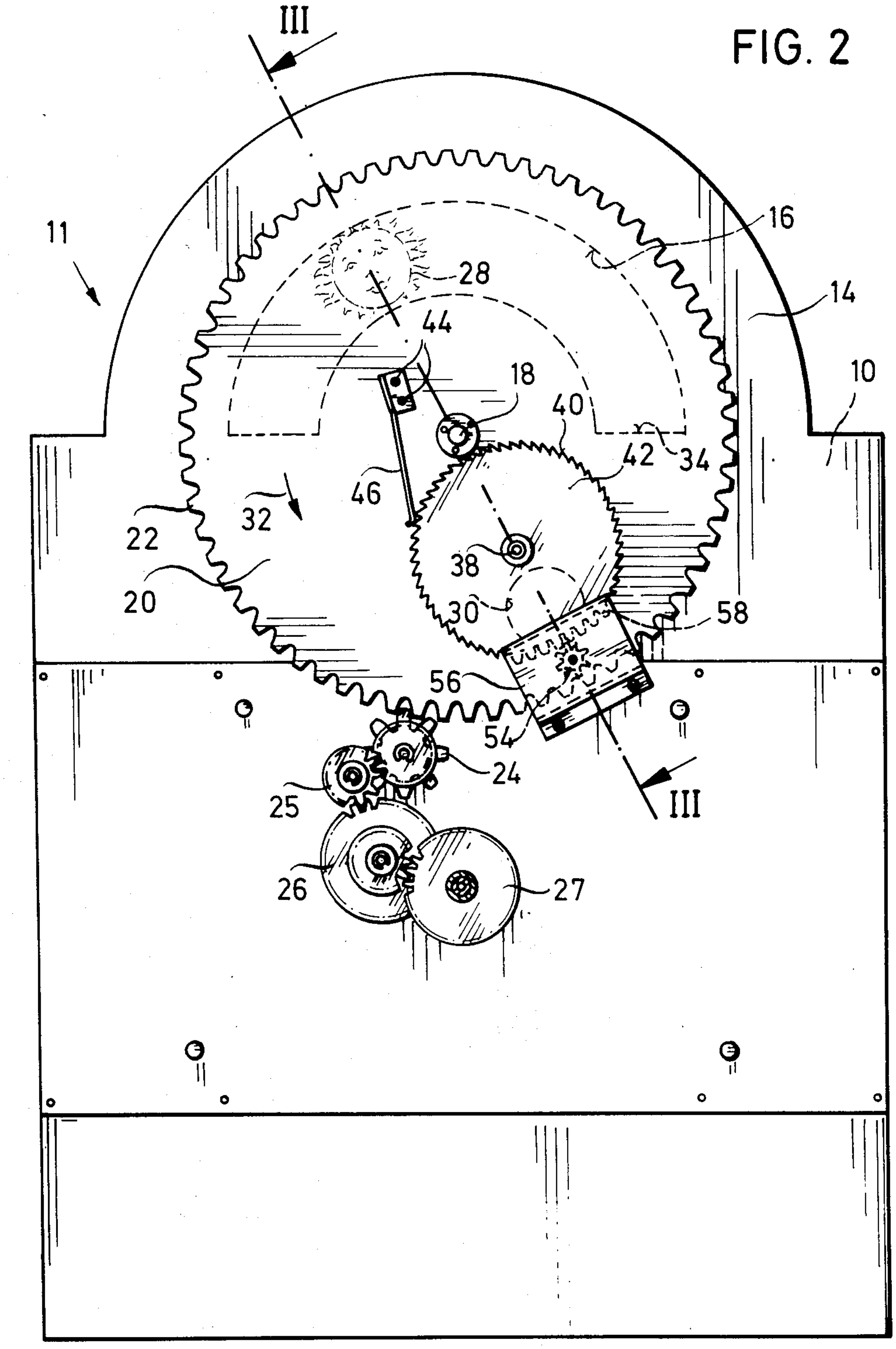
FIG. 2 a rear view of the clock as in FIG. 1 with the clock mechanism and strike mechanism removed FIG. 3 a cross-section along line III—III of FIG. 2
Figure 3:
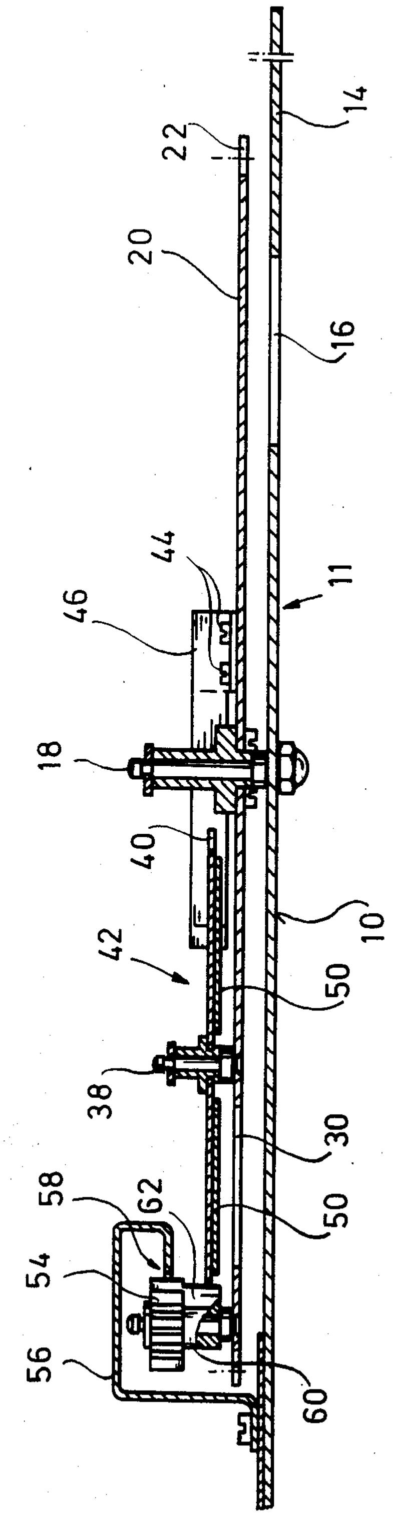
Figure 6:
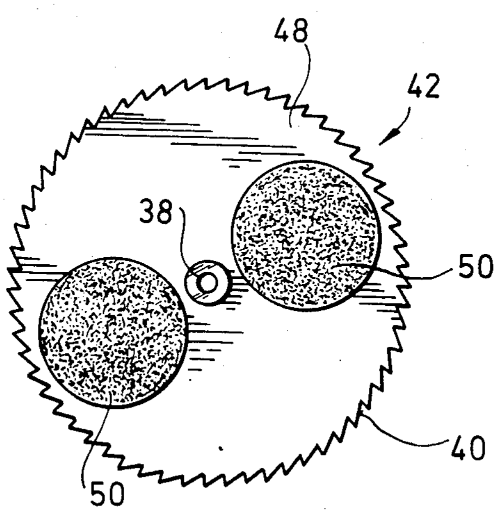
FIG. 6 a direct view of the moon phase disc as in FIG. 1
Figure 11:
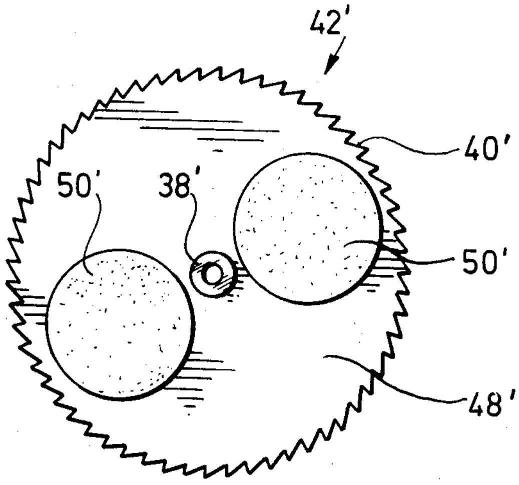
Figure 7:
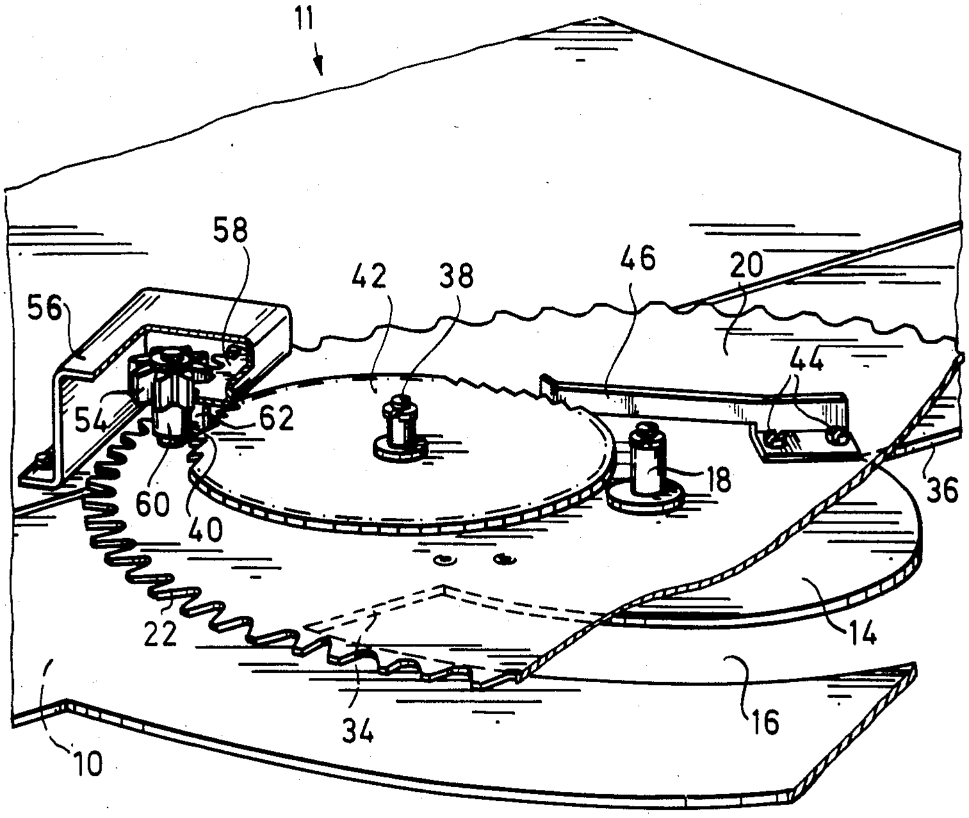
FIG. 7 an oblique view of the gear mechanism of the moon phase disc as in FIG. 1
Figure 8:
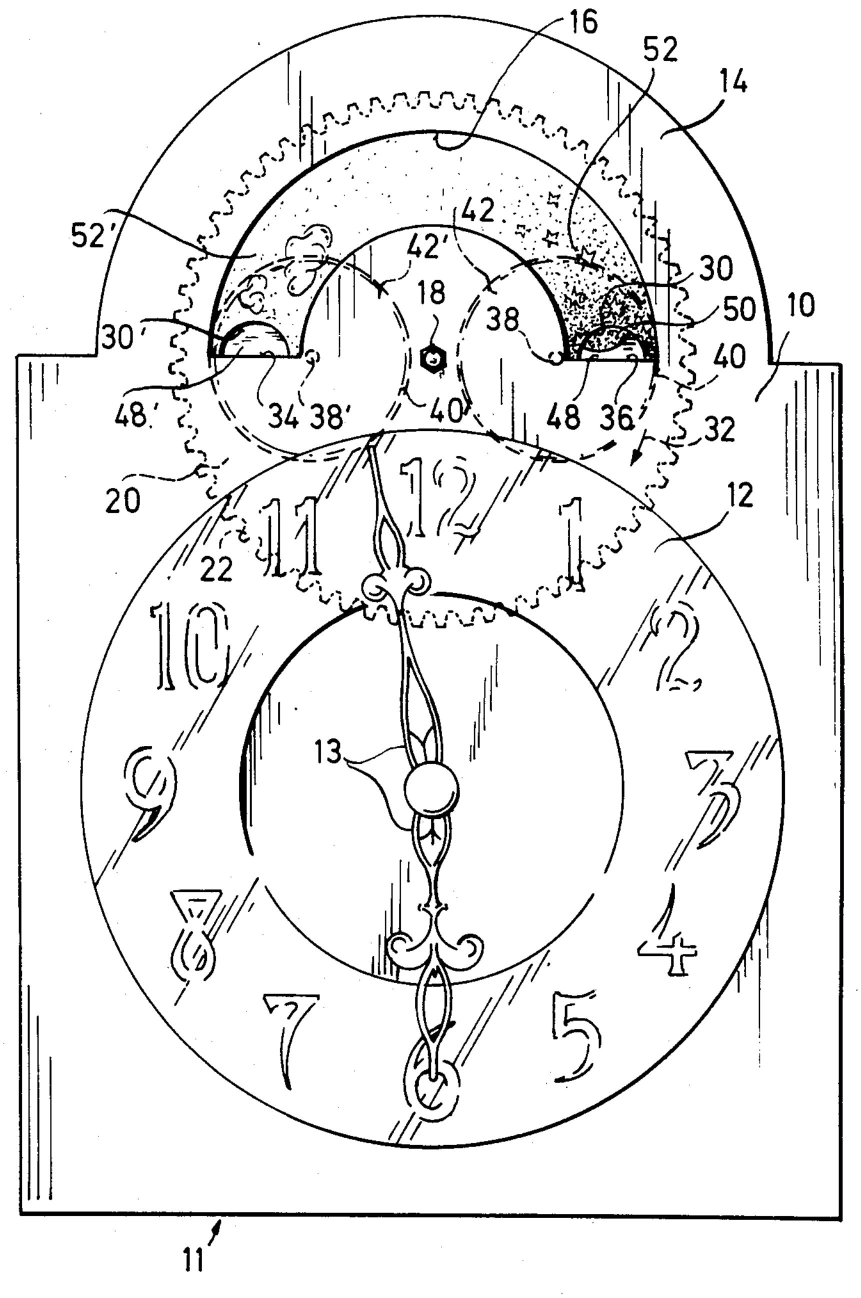
FIG. 8 a frontal view corresponding to FIG. 1 of a second prototype of the invented clock FIG. 9 a rear view corresponding to FIG. 2 of the second prototype FIG. 10 a cross-section along Line X—X in FIG. 9 and FIG. 11 a direct view corresponding to FIG. 6 of the second moon phase disc of the second prototype.
Figure 9:
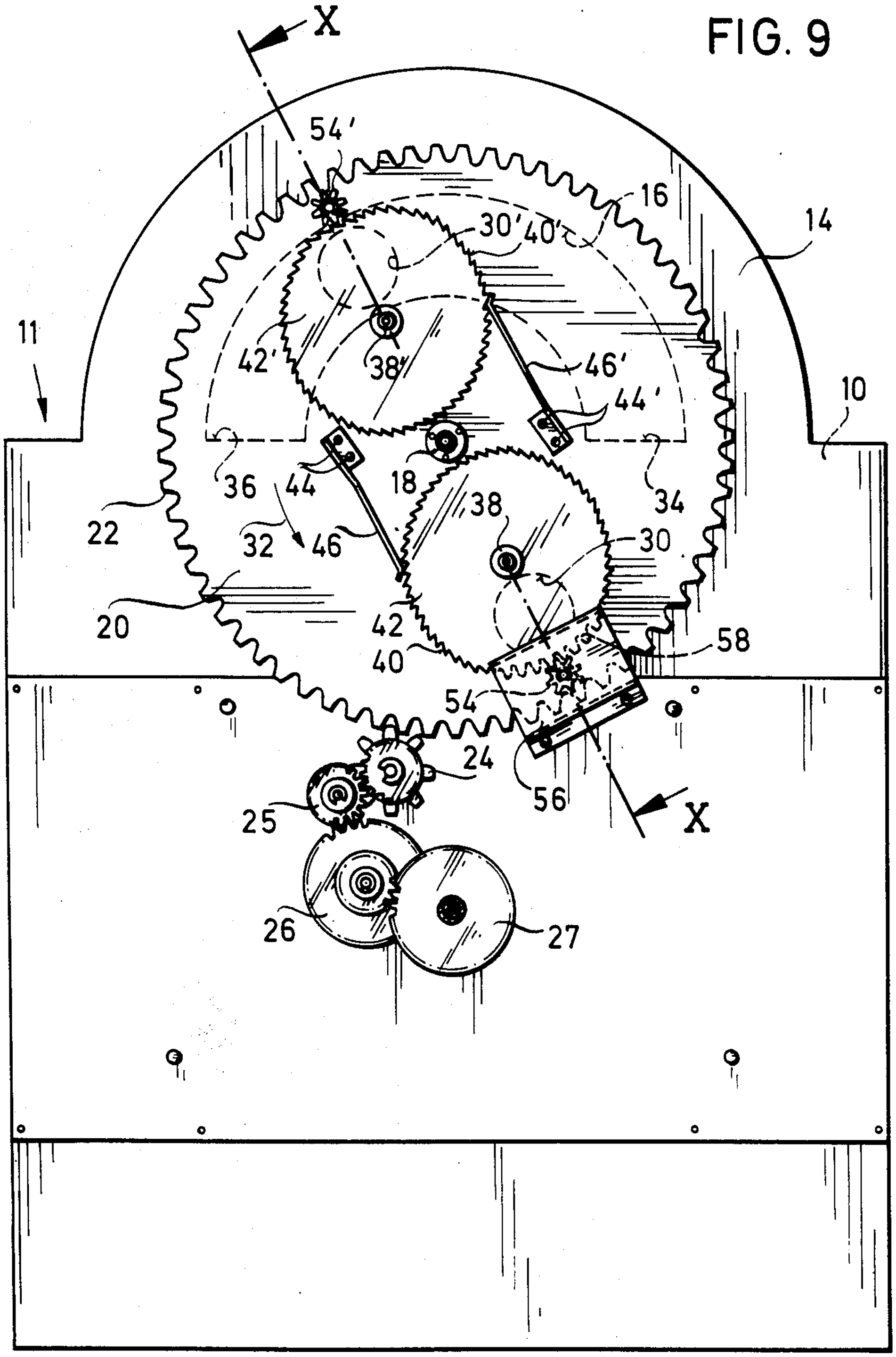
Figure 10:
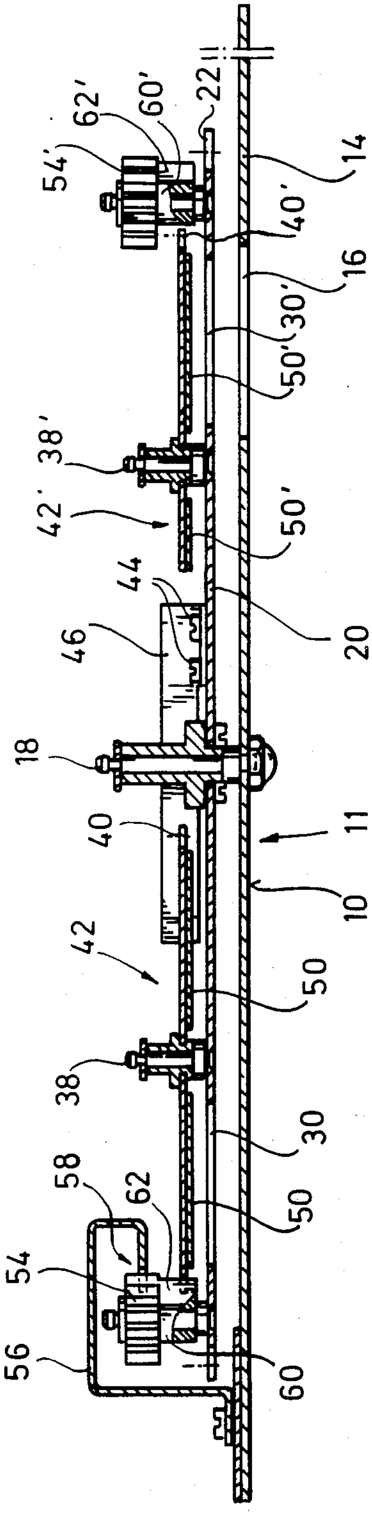

Next will be described the first prototype of the invented clock as shown in FIGS. 1 through 7. The general 10 decorated visible surface of the front of the clock, which is the front side of a platen 11, includes a clock dial 12 with hands 13 as well as a semicircular addition 14 with a semicircular opening 16 arching downwards. Behind the opening and covering it and with its axis 18 on the radial center of the opening 16 is attached a turnable circular moon disc 20. The rim of the moon disc is supplied with teeth 22 which, as is evident in FIG. 2, mesh with a pinion 24, which is driven through gears 25 and 26 by the hour gear 27 which is driven by the clock movement 27*a* described in FIG. 1*a* in such a manner, that the moon disc 20 makes a full revolution around the axis 18 in twenty four hours. A perpendicular 27*c* and weights 27*d* hang down from the clock mechanism for its drive. A strike mechanism 27*b* is attached to the reverse of the clock mechanism 27*a*. The clock mechanism 27*a* is attached from its side to the platen 11.

The moon disc 20 displays a picture of the sun 28 and a circular cut-out 30 on diametrically opposite sides of the axis 18. The distances of the sun image 28 and the cut-out 30 from the axis 18 are chosen so that they, during the turning of the moon disc 20 in the direction of the arrow 32, alternately appear in the opening 16 in the clock face 10 and move from the rising horizon 34 through to the setting horizon 36. For expediency, such an orientation of the moon disc is chosen so that the picture of the sun is visible from about six o'clock in the morning until 6 o'clock in the evening, and so that the cut-out encompassing the picture of the moon image is visible in the opening 16 from about six O'clock in the evening until six o'clock in the morning.

A moon phase disc 42, with a gear rim 40 and turning on an axis 38, is attached off-center to the moon disc 20 on the reverse side of the clock face 10. It is kept in its rotating position with respect to the moon disc 20 through a retaining spring 46, attached with screws 44 to the moon disc, pressing on its gear rim 40. The moon phase disc 42 covers the cut-out 30 and carries on its side facing the cut-out 30 around the circumference alternating light areas 48, corresponding to the brightness of the illuminated moon, and dark circular areas 50 corresponding to the shadowed moon. An image of the starry sky 52 is provided on the moon disc 20 in the vicinity of the cut-out 30.

A rim-geared control gear 54 is positioned in a rotating manner along the radial extension between the axes 18 and 38, on the same side as the moon disc 20, beyond the rim of the moon phase disc 42. The control gear 54 runs through a rack bridge 56, which is rigidly fixed to the clock face 10, once for each revolution of the moon disc 20 and by passage through it meshes with a section of rack 58 having a slight curvature with respect to the radius of the moon disc 20 and along its circumference. The relative divisions of the control gear 54 and the rack section 58 are chosen in such a manner that the control gear 54, by passage through the rack bridge 56, each time makes a full revolution.

An interior section 60 along the axial extension of the serration of the control gear 54 shows a control cam 62 which, with each revolution of the control gear 54, advances the moon phase disc 42 by one tooth along the gear rim 40. As this advance occurs once daily, preferably during the day, each night the next moon phase appears in the cut-out 30, which for its part is again visible in the opening 16. The serration of the gear rim 40 and the arrangement of the light areas 48 with respect to the dark circular areas 50 is chosen in such a way that sequentially 14 waxing and 14 waning moon phases are portrayed in the cut-out 30.

With the second prototype of the invented clock, presented in FIGS. 8 to 11, the same reference symbols are used for the same or similar parts as for the first prototype. The second prototype is significantly different from the first in that, on the moon disc 20, instead of the sun image 28 being diametrically opposite the moon image 30, 48, 50, a second moon image is arranged which, alternately with the first moon image, allows the moon to appear during the day in the opening 16 with the appropriate phase. The second moon image also shows up in a second circular cut-out 30′ of the moon disc 20. On the backside of the clock face 10, a second moon phase disc 42′ with a second rim gear 40′ and rotating around an axis 38′, is fastened off-center on the moon disc 20. It is also held in its rotating position with respect to the moon disc 20 by the second retaining spring 46′ fastened to the moon disc 20 by means of screws 44′ and pressing on the gear rim 40′. The second moon disc 42′ covers the cut-out 30′ and carries on its side facing the cut-out 30′ along the circumference second alternating light areas 48′, corresponding to the brightness of the illuminated moon, and not so light circular areas 50′, corresponding to the shadowed moon in the blue daylight sky. In the vicinity of the cut-out 30′ the moon disc 20 carries, corresponding to the starry sky 52 with the first moon image, a daylight sky 52′ provided with clouds.

The moon phase currently appearing in the cut-out 30′ will likewise be adjusted by the passage of the second control gear 54′ through the rack bridge 56 by means of the control cam 62′ along the interior section 60′ of the control gear 54′. This adjustment occurs preferably during the night, as this second moon image is visible during the day in the opening 16. For the rest, this second moon image has the same function as the above described first moon image.

The claims are not limited to the described prototypes portrayed in the Figures. So the color, brightness and form of the sun image 28, of the areas 48, 48′, of the circular areas 50, 50′, of the starry sky 52, and of the daylight sky 52′ can be chosen at will, so that the observer is allowed to recognize the desired assertions in the opening 16 in reference to the sun and, respectively, the moon with its prevailing phases during its daily path and alternating therewith during its nightly path. Obviously, the driver can be widely chosen at will through the mechanism of the clock and its associated transmission gear. The clock is naturally functional also without a strike mechanism and the portrayed details are only chosen as a practical example.

I claim:

1. A clock for representing moon phases at night, said clock comprising:

- a window in the face of the clock;
- a rotatable moon disc having a circular hole for defining an image representing the moon, said moon disc being parallel to the face of the clock and visible through said window in the face of the clock, said circular hold being visible through said window in the face of the clock;
- a rotatable moon phase disc visible through said window and said circular hole, said moon phase disc attached to the backside of said moon disc on an axis offset from the axis of the rotation of said moon disc and having alternating light background areas and dark circular areas, said light areas corresponding to the brightness of the illuminated moon and said dark circular areas corresponding to the shadowed moon, portions of said light areas and said dark areas being successively visible through said circular hole and said window, said visible portions corresponding to moon phases;
- means for rotating said moon disc with respect to said window; and
- means for rotating said moon phase disc with respect to said moon disc.

2. The clock described in claim 1, wherein said moon disc has a circular image of the sun at a location diametrically opposite to the location of said circular hole, said sun image being visible through said window when said circular hole is not visible through said window.

3. The clock described in claim 1, wherein means for rotating said moon phase disc are advanced in predetermined increments corresponding to successive moon phase changes.

4. The clock described in claim 1, wherein said means for rotating said moon phase disc are advanced to a successive moon phase position every twenty-four hours.

5. The clock described in claim 1, wherein said circular hole in said moon disc has a center lying on a radial line through the center of said moon disc.

6. The clock described in claim 1, wherein said window in the face of the clock is in the form of a semicircular arch.

7. The clock described in claim 1, wherein:

- said means for rotating said moon phase disc includes a rotatable control cam which rotates around a shaft projecting perpendicularly from said moon disc;
- said control cam is connected to a control gear which is driven by a stationary gear fixed to a nonmovable part of the clock; and
- said control cam is moved one increment by said stationary-gear-driven control gear for each predetermined clock cycle to advance the moon phase one increment for each predetermined clock cycle.

8. The clock described in claim 7, wherein said stationary gear is a rack gear.

9. The clock described in claim 7, wherein said cam gear and said control gear are a unified control gear/-cam gear having a common shaft for rotation.

10. The clock described in claim 1, wherein the rotational axis of said moon disc and the rotational axis of said moon phase disc lie on a diameter line through the center of said moon disc.

11. The clock described in claim 7, wherein the rotational axis of said moon disc, the rotational axis of said moon phase disc, and the shaft for rotation of said control gear lie on a diameter line through the center of said moon disc.

12. A clock for representing moon phases at night, said clock comprising:

a window in the face of the clock, said window in the form of a semicircular arch;

a rotational moon disc having a circular hole for defining an image representing the moon, said moon disc being parallel to the face of the clock and visible through said window in the face of the clock, said circular hole being visible through said window in the face of the clock, said moon disc having a circular image of the sun at a location diametrically opposite to the location of said circular hole, said sun image being visible through said window when said circular hole is not visible through said window, said circular hole in said moon disc having a center lying on a radial line through the center of said moon disc;

a rotatable moon phase disc visible through said window and said circular hole, said moon phase disc attached to the backside of said moon disc and having alternating light background areas and dark circular areas, said light areas corresponding to the brightness of the illuminated moon and said dark circular areas corresponding to the shadowed moon, portions of said light areas and said dark areas being successively visible through said circular hole and said window, said visible portions corresponding to moon phases;

means for rotating said moon disc with respect to said window; and means for rotating said moon phase disc with respect to said moon disc, said means for rotating said moon phase disc being advanced in predetermined increments every twenty-four hours corresponding to successive moon phase changes, said means for rotating said moon phase disc including a rotatable control cam which rotates around a shaft projecting perpendicularly from said moon disc, said control cam connected to a control gear which is driven by a stationary rack gear fixed to a nonmovable part of the clock, and said control cam moved one increment by said stationary-gear-driven control gear for each predetermined clock cycle to advance the moon phase one increment for each predetermined clock cycle, said cam gear and said control gear being a unified control gear/cam gear having a common shaft for rotation, wherein the rotational axis of said moon disc, the rotational axis of said moon phase disc, and the shaft for rotation of said control gear lie on a diameter line through the center of said moon disc.

13. A clock for representing moon phases at night and during the day, said clock comprising:

a window in the face of the clock;

a rotatable moon disc having a first circular hole for defining an image representing the moon at night and having a second circular hole for defining an image representing the moon during the day, said moon disc being parallel to the face of the clock and visible through said window in the face of the clock, said first and second circular holes being visible through said window in the face of the clock;

a first rotatable moon phase disc visible through said window and said first circular hole and a second rotatable moon phase disc visible through said window and said second circular hole, said first moon phase disc attached to the backside of said moon disc and having alternating first light background areas and first dark circular areas, said first light areas corresponding to the brightness of the illuminated moon at night and said first dark circular areas corresponding to the shadowed moon at night, portions of said first light areas and said first dark areas being successively visible through said first circular hole and said window, said first visible portions corresponding to moon phases visible in a night sky, said second moon phase disc attached to the backside of said moon disc and having alternating second light background areas and second dark circular areas, said second light areas corresponding to the brightness of the illuminated moon during the day and said second dark circular areas corresponding to the shadowed moon during the day, portions of said second light areas and said second dark areas being successively visible through said second circular hole and said window, said second visible portions corresponding to moon phases visible in a day sky;

means for rotating said moon disc with respect to said window; and means for rotating said first and second moon phase discs with respect to said moon disc.

* * * * *